United States Patent [19]

Henry et al.

[11] Patent Number: 4,923,271
[45] Date of Patent: May 8, 1990

[54] OPTICAL MULTIPLEXER/DEMULTIPLEXER USING FOCUSING BRAGG REFLECTORS

[75] Inventors: Charles H. Henry, Montgomery Township, Somerset County; Rudolf F. Kazarinov, Martinsville, both of N.J.; Rodney C. Kistler, Easton, Pa.; Kenneth J. Orlowsky, Borough of Middlesex, N.J.; Yosi Shani, Murray Hill, N.J.; Aasmund S. Sudbo, Summit, N.J.

[73] Assignee: American Telephone and Telegraph Company, New York, N.Y.

[21] Appl. No.: 329,468

[22] Filed: Mar. 28, 1989

[51] Int. Cl.$^5$ ............................................. G02B 6/34
[52] U.S. Cl. ............................ 350/96.19; 350/96.16
[58] Field of Search ............... 350/96.19, 96.15, 96.16

[56] References Cited

U.S. PATENT DOCUMENTS

| | | | |
|---|---|---|---|
| 4,440,468 | 4/1984 | Auracher et al. | 350/96.19 X |
| 4,715,027 | 12/1987 | Mahapatra et al. | 370/3 |
| 4,739,501 | 4/1988 | Fussgänger | 350/96.19 X |
| 4,740,951 | 4/1988 | Lizet et al. | 370/3 |
| 4,741,588 | 5/1988 | Nicia et al. | 350/96.19 |
| 4,746,186 | 5/1988 | Nicia | 350/96.13 |
| 4,748,614 | 5/1988 | Dammann et al. | 370/3 |

OTHER PUBLICATIONS

"Periodic Structures and Their Application...", *IEEE Trans. Microwave Theory and Tech.*, vol. MTT-21, No. 12, Dec. 1973, pp. 775-785, W. C. S. Chang.
"Integrated-Optic Wavelength Multi- and Demultiplexers...", *Applied Optics*, vol. 21, No. 12, Jun. 1982, pp. 2195-2198, T. Suhara et al.
"Focusing Grating Couplers...", *J. Lightwave Tech.*, vol. 6, No. 6, Jun. 1988, pp. 1028-1033, S. Ura et al.

*Primary Examiner*—John D. Lee
*Assistant Examiner*—Phan T. Heartney
*Attorney, Agent, or Firm*—Wendy W. Koba

[57] ABSTRACT

An optical device is disclosed which provides wavelength multiplexing/demultiplexing utilizing a plurality of focusing Bragg reflectors. Each Bragg reflector includes a plurality of confocal (i.e., common foci) elliptical grating lines, with the exit/entrance ports of the input/output waveguides located at the foci of the ellipse. By virtue of the elliptical design, the signal propagating outward from the exit port of the input waveguide will be reflected by the appropriate Bragg reflector and focused into the entrance port of the appropriate output waveguide. When each Bragg reflector exhibits a different ellipticity, but shares one common focal point, optical multiplexing/demultiplexing may be achieved. Optical filtering may be achieved when all Bragg reflectors are designed to have common foci.

26 Claims, 7 Drawing Sheets

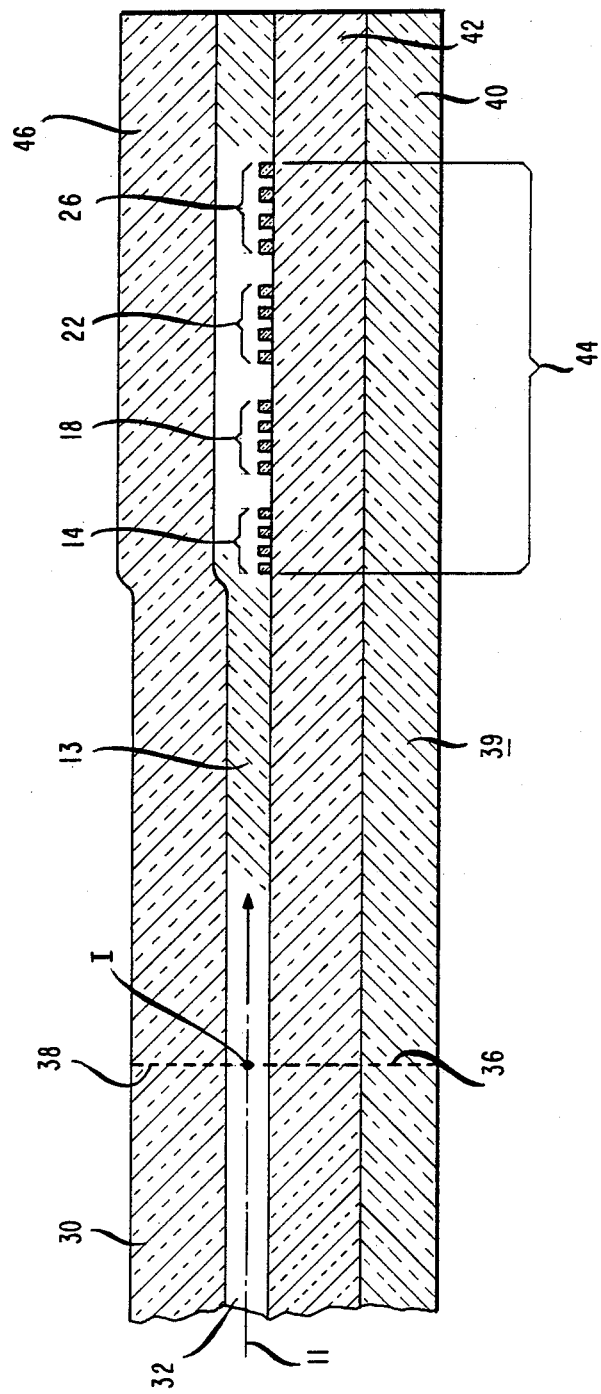

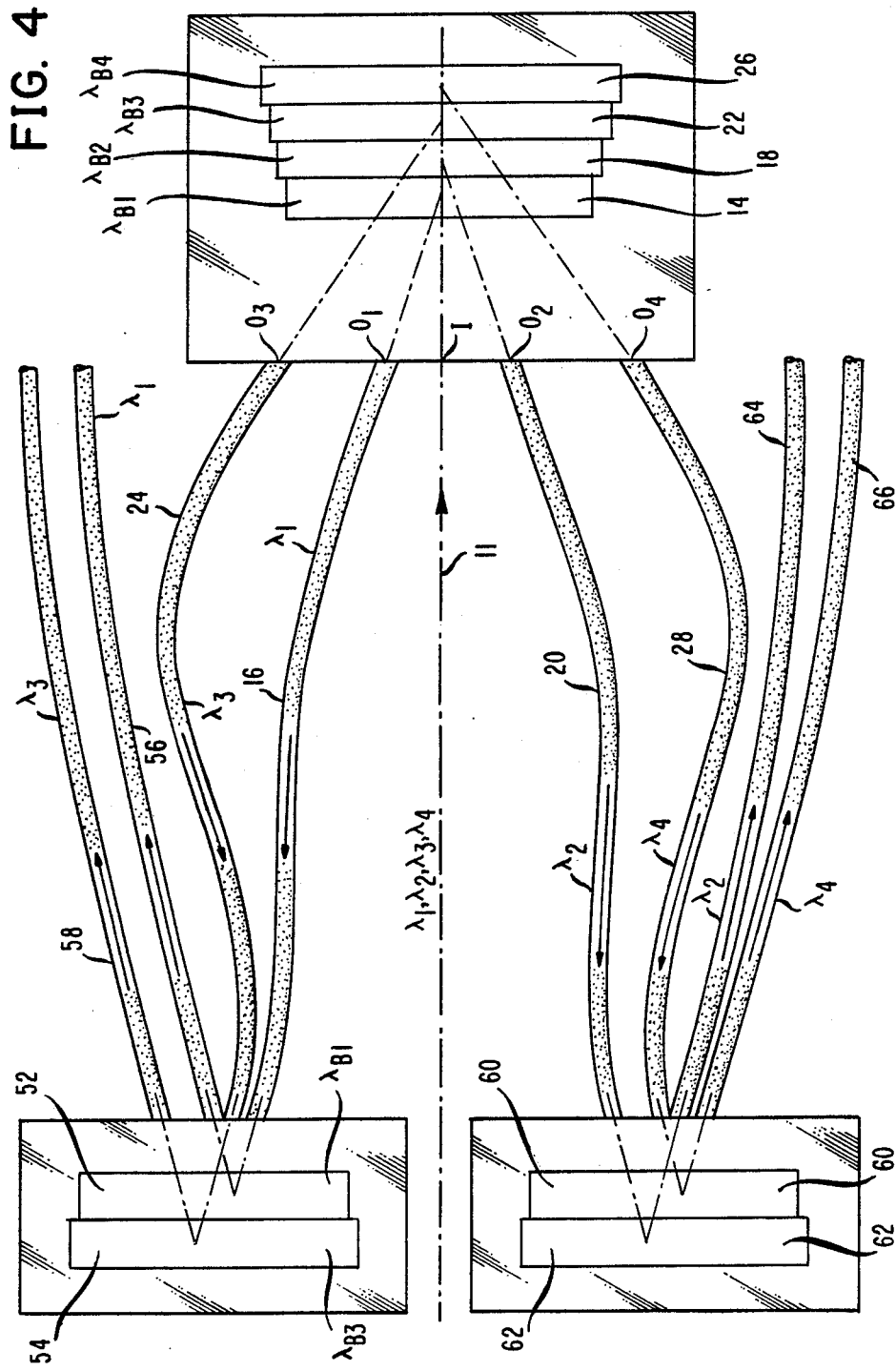

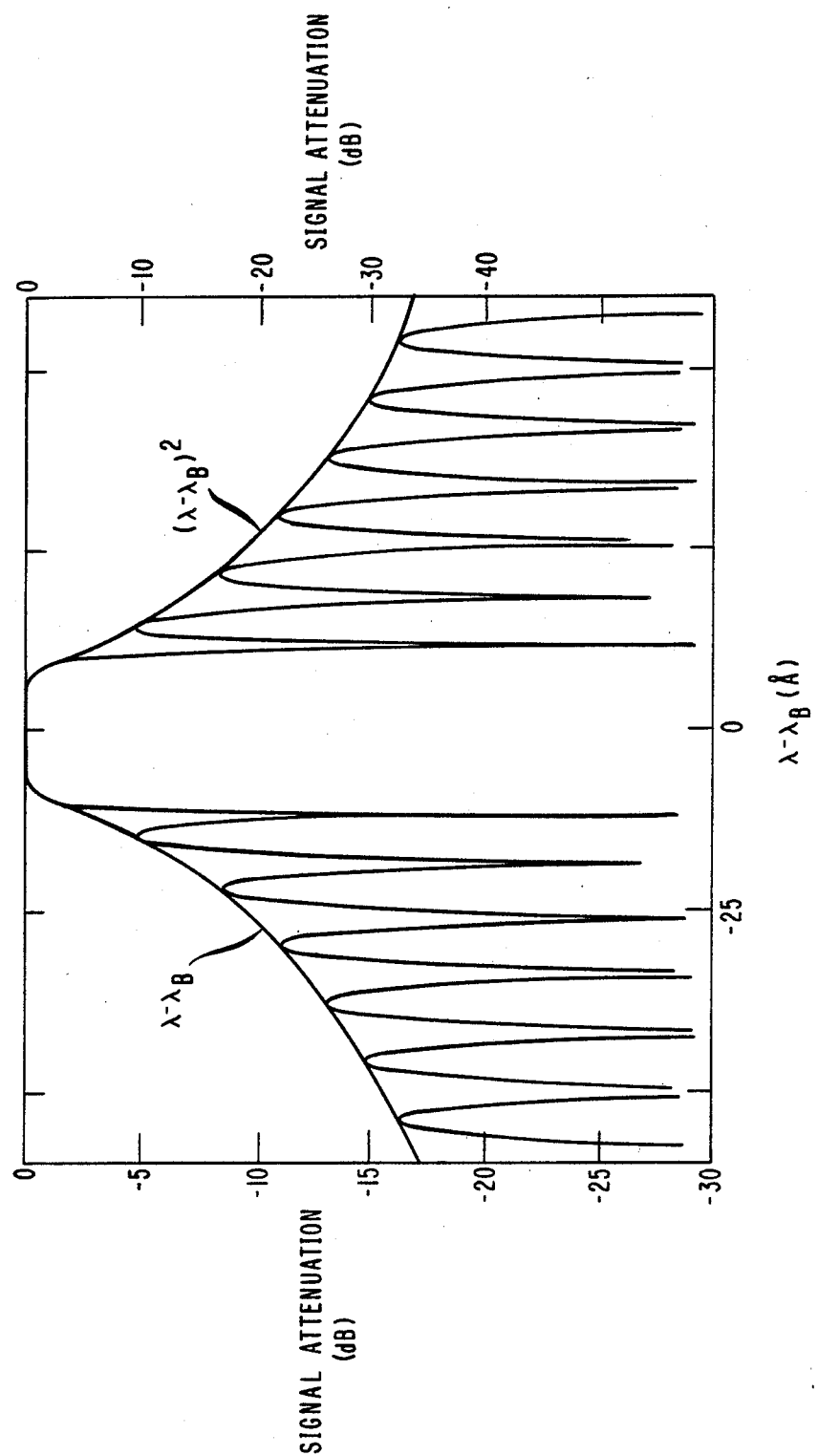

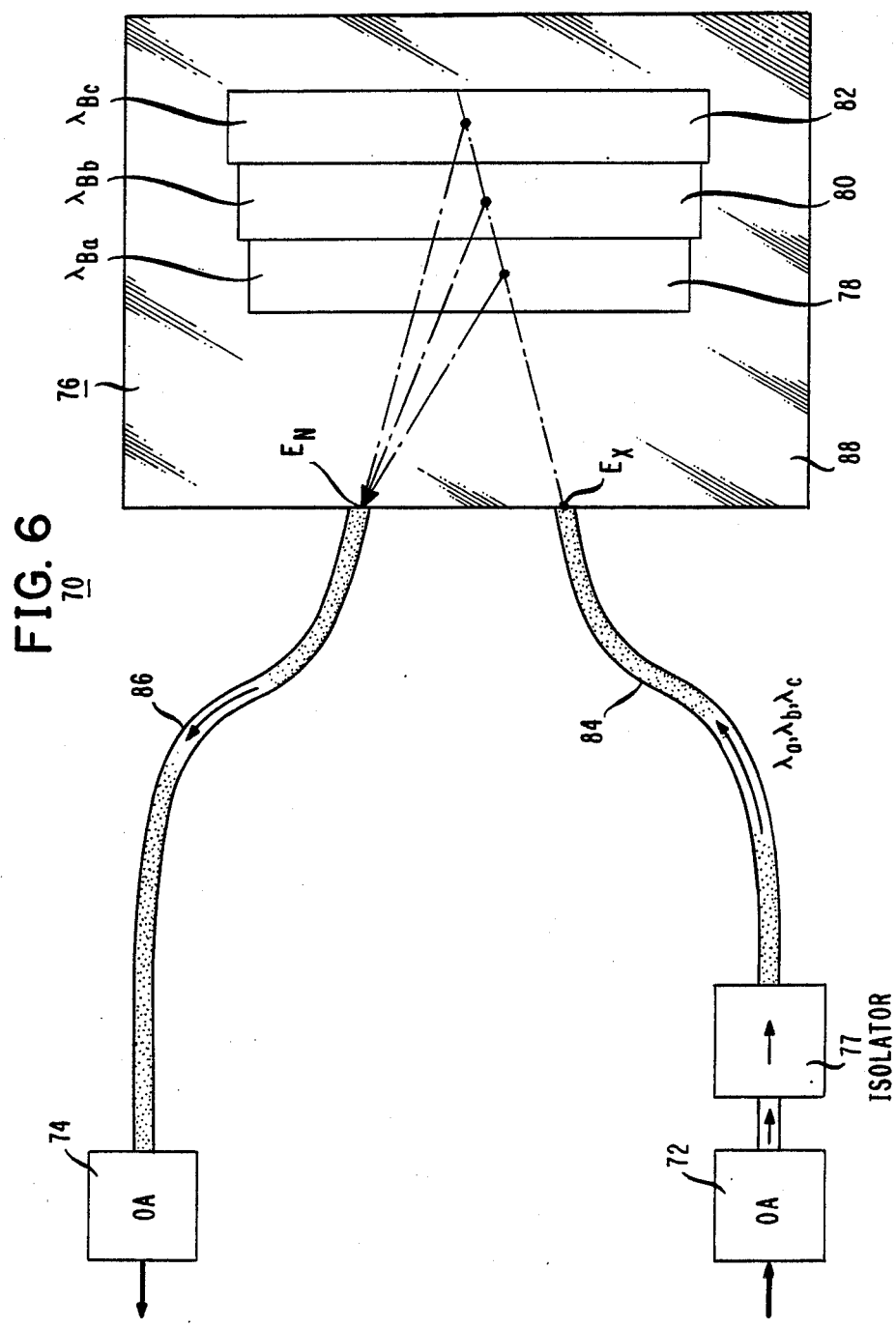

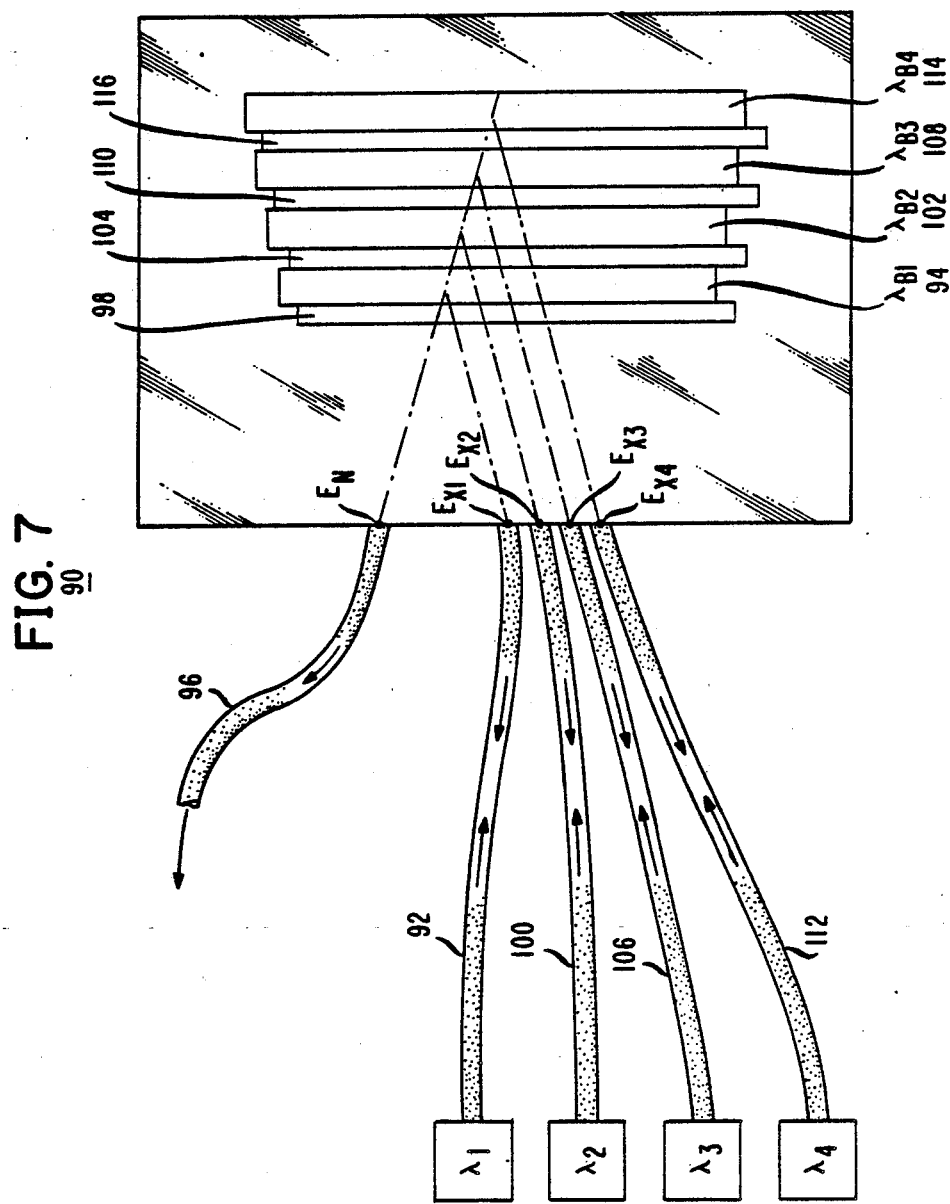

OPTICAL MULTIPLEXER/DEMULTIPLEXER USING FOCUSING BRAGG REFLECTORS

BACKGROUND OF THE INVENTION

The present invention relates to an optical multiplexer/demultiplexer and, more particularly, to such an arrangement which utilizes focusing Bragg reflectors.

In many optical communication systems, there exists a need to perform multiplexing/demultiplexing of optical signals having different wavelengths, known as wavelength division multiplexing (WDM). Preferably, these operations are provided by some sort of monolithic, integrated optical structure. Bragg reflectors, comprising a series of parallel grating lines, are often used in these devices as wavelength-selective filters.

One particular integrated optical multiplexing/demultiplexing scheme is disclosed in U.S. Pat. No. 4,740,951 issued to J. Lizet et al. on Apr. 26, 1988. Lizet et al. disclose an integrated structure formed on a silicon substrate including an input waveguide and collimating means, a plurality of n Bragg reflectors with an associated plurality of n focusing mirrors, and a plurality of n output waveguides. The n Bragg reflectors, constructed by etching layered dielectric films on a silicon substrate to form linear gratings, are arranged in cascade fashion where each functions to reflect a different one of the n possible wavelengths of transmission. The etched mirrors are utilized to focus the reflected wavelengths into the core region of the corresponding output waveguides. Although this arrangement is capable of achieving optical multiplexing/demultiplexing, the utilization of etched mirrors as focusing elements is considered to introduce unacceptable scattering and coupling losses into the system.

An alternative monolithic arrangement is disclosed in U.S. Pat. No. 4,746,186 issued to A. J. A. Nicia on May 24, 1988. Nicia discloses an integrated optical multiplexer/demultiplexer wherein the input and output fibers are attached to the same face of the device. A doubly periodic Bragg reflector, formed by etching dielectric films on a silicon substrate, is used to separate the various wavelengths and direct each signal to its associated output fiber. Since a single Bragg reflector is used to redirect all of the wavelengths into a number of different output channels, the reflector must have a relatively large bandwidth sufficient to cover all of the channels. Such a broadband reflector tends to be polarization dependent and lossy, due to scattering and coupling losses.

Thus, a need remains in the prior art for a monolithic optical multiplexer/demultiplexer arrangement which is relatively compact and simple to manufacture, providing reproducible results, yet capable of low insertion loss and polarization independent operation.

SUMMARY OF THE INVENTION

The need remaining in the prior art is addressed by the present invention which relates to an optical multiplexer/demultiplexer and, more particularly, to such an arrangement which uses at least one focusing Bragg reflector in the form of an essentially elliptical grating to direct the optical signals between the input and output waveguides. Thus, each Bragg reflector serves the combined purposes of wavelength selection and focusing. Efficient coupling is achieved by locating the exit and entrance ports of the input and output waveguides at the foci of the ellipse so that the reflected signal will be focused at the entrance port of the output waveguide.

In accordance with one embodiment of the present invention, a plurality of N essentially elliptical Bragg reflectors are formed in a serial arrangement, with each reflector comprising a series of confocal (i.e., common foci) elliptically shaped grating lines. The plurality of N Bragg reflectors share one common focal point and by modifying the ellipticity of each reflector, the location of its remaining focal point may be changed, allowing for adequate spacing to be provided between the input and output waveguides. Preferably, the plurality of N elliptical Bragg reflectors are ordered such that the reflector associated with the shortest wavelength is positioned closest to the incoming lightwave to reduce attenuation due to Bragg scattering out of the optical guiding medium by the off-resonant Bragg reflectors. This scattering is known to be strong for light of a wavelength shorter than the Bragg wavelength of the grating.

In an alternative embodiment of the present invention, a relatively low cross-talk demultiplexer is achieved using double filtering. That is, an additional set of elliptical Bragg reflectors is used to increase isolation between signals at adjacent wavelengths. Specifically, a second elliptical Bragg reflector filter is introduced into each signal path such that the twice reflected signals will exhibit a doubling (in terms of dB) of isolation. In general, M such sets of elliptical Bragg reflector filters may be cascaded, since the insertion loss of each filter is small.

Elliptical Bragg reflectors formed in accordance with the present invention may be used to provide filtering, without multiplexing or demultiplexing. Such filters can have very low insertion loss and low return of power to the input signal source. The implementation of elliptical Bragg reflectors as a filter is especially useful as an in-line filter between stages of an optical amplifier. Without such filtering, spontaneous emission from the first stage may saturate the output stage amplifier. Modifications providing filtering and/or multiplexing with feedback may also be achieved.

Other and further arrangements of the present invention will become apparent during the course of the following discussion and by reference to the accompanying drawings.

BRIEF DESCRIPTION OF THE DRAWING

Referring now to the drawings, where like numerals represent like parts in several views:

FIG. 3 is a cut-away side view in perspective of the exemplary arrangement of FIG. 1;

FIG. 4 illustrates an alternative embodiment of the present invention which utilizes two sets of elliptical Bragg reflectors to provide double filtering;

FIG. 5 is a graph illustrating the improvement in signal isolation when utilizing a double filtering arrangement as illustrated in FIG. 4;

FIG. 6 illustrates an optical amplifier arrangement which utilizes an in-line filter comprising a set of elliptical Bragg reflectors formed in accordance with the present invention; and FIG. 7 illustrates an alternative optical multiplexer with feedback utilizing focusing Bragg reflectors formed in accordance with the present invention.

DETAILED DESCRIPTION

Figure 1:
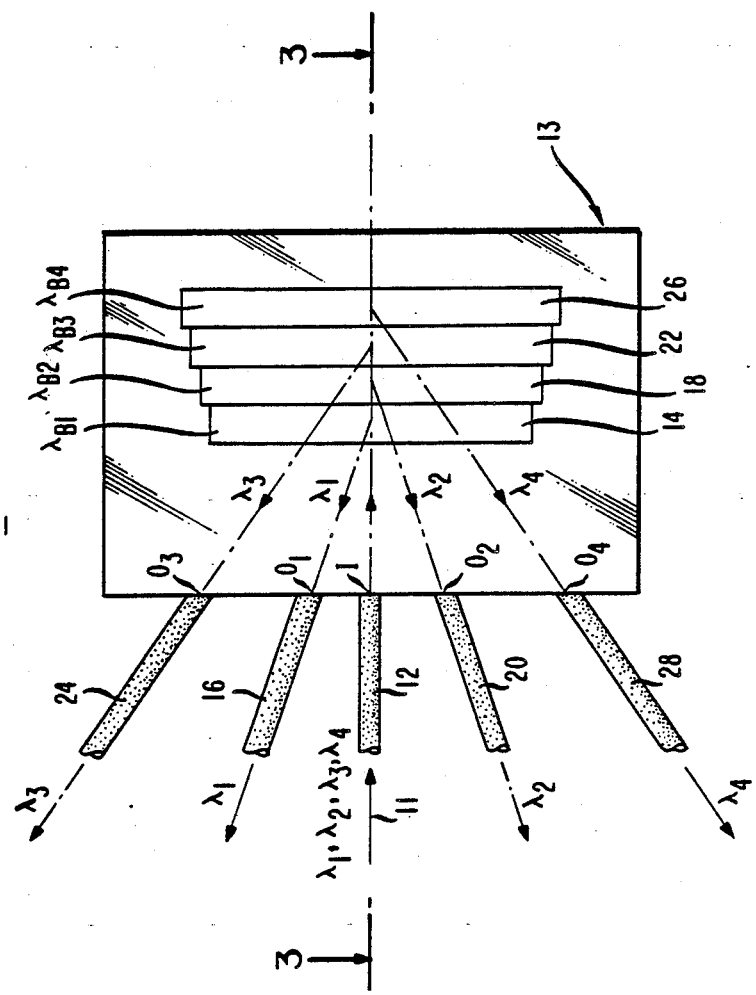
FIG. 1 illustrates an exemplary integrated optical multiplexer/demultiplexer arrangement utilizing elliptical Bragg reflectors formed in accordance with the present invention.

An exemplary integrated optical multiplexer/demultiplexer 10 of the present invention is illustrated in FIG. 1. The following will describe the operation of arrangement 10 as an optical wavelength division demultiplexer. It is to be understood that arrangement 10 may also be operated in the reverse direction as an optical wavelength multiplexer.

Referring to FIG. 1, an incident lightwave 11 containing a plurality of optical signals at wavelengths $\lambda_1$, $\lambda_2$, $\lambda_3$, and $\lambda_4$ is coupled to input waveguide 12 of arrangement 10. In general, a wavelength demultiplexer formed in accordance with the present invention may operate with N different wavelengths ($N > 1$), where a demultiplexer utilizing four different wavelengths has been chosen for exemplary purposes only. Additionally, input waveguide 12 may embody a number of different forms, including an optical waveguide which is coupled to an optical guiding medium, for example, a layer 13 of a material with a relatively high index of refraction, in a manner which provides sufficient optical coupling (e.g., butt-coupled to the endface of optical guiding layer 13). Alternatively, input waveguide 12 may comprise an optical waveguide directly formed in the guiding layer, or an active optical device such as a semiconductor laser diode or an optical amplifier. The physical properties of one such waveguide 12, as well as the remaining portions of arrangement 10, will be described in more detail below in association with FIGS. 2 and 3.

Returning to FIG. 1, incident lightwave 11 exits through exit port I of waveguide 12 and enters optical guiding layer 13. The radiation then propagates in optical guiding layer 13 towards the plurality of elliptical Bragg reflectors. In particular, a first elliptical Bragg reflector 14 comprises a plurality of confocal (i.e., common focal points) elliptical grating lines, formed so as to reflect the signal propagating at $\lambda_1$, where the following relations are utilized to correctly size the dimensions of first reflector 14:

$$a = \lambda_B/(2n), \text{ and}$$

$$L = XL_B,$$

where a is defined as the period of the grating (the period a should be measured along the major axis of the ellipses upon which the grating lines lie), $\lambda_B$ is the specific wavelength desired to be reflected (Bragg wavelength) defined as a physical property of the reflector, and n is the index of refraction of the optical guiding layer. Throughout the remainder of this discussion, the term $\lambda_{Bi}$ will refer to the physically determined wavelength of the reflector, and the term $\lambda_i$ will refer to the wavelength of the associated optical signal. The term L is the length of the Bragg reflector, where X is a multiplicative factor (typically between 1 and 5), and $L_B$ is defined as the Bragg length, that is, the length of the grating necessary to provide appreciable Bragg reflection. The bandwidth $\Delta\lambda$ of a Bragg reflector defines the range of wavelengths which will be reflected and is given by the approximate relation:

$$\Delta\lambda \cong \lambda_B a/L_B.$$

From the above, it is obvious that in order to form a narrowband Bragg reflector, (i.e., small $\Delta\lambda$), L must be large for a given $\lambda_B$.

Figure 2:
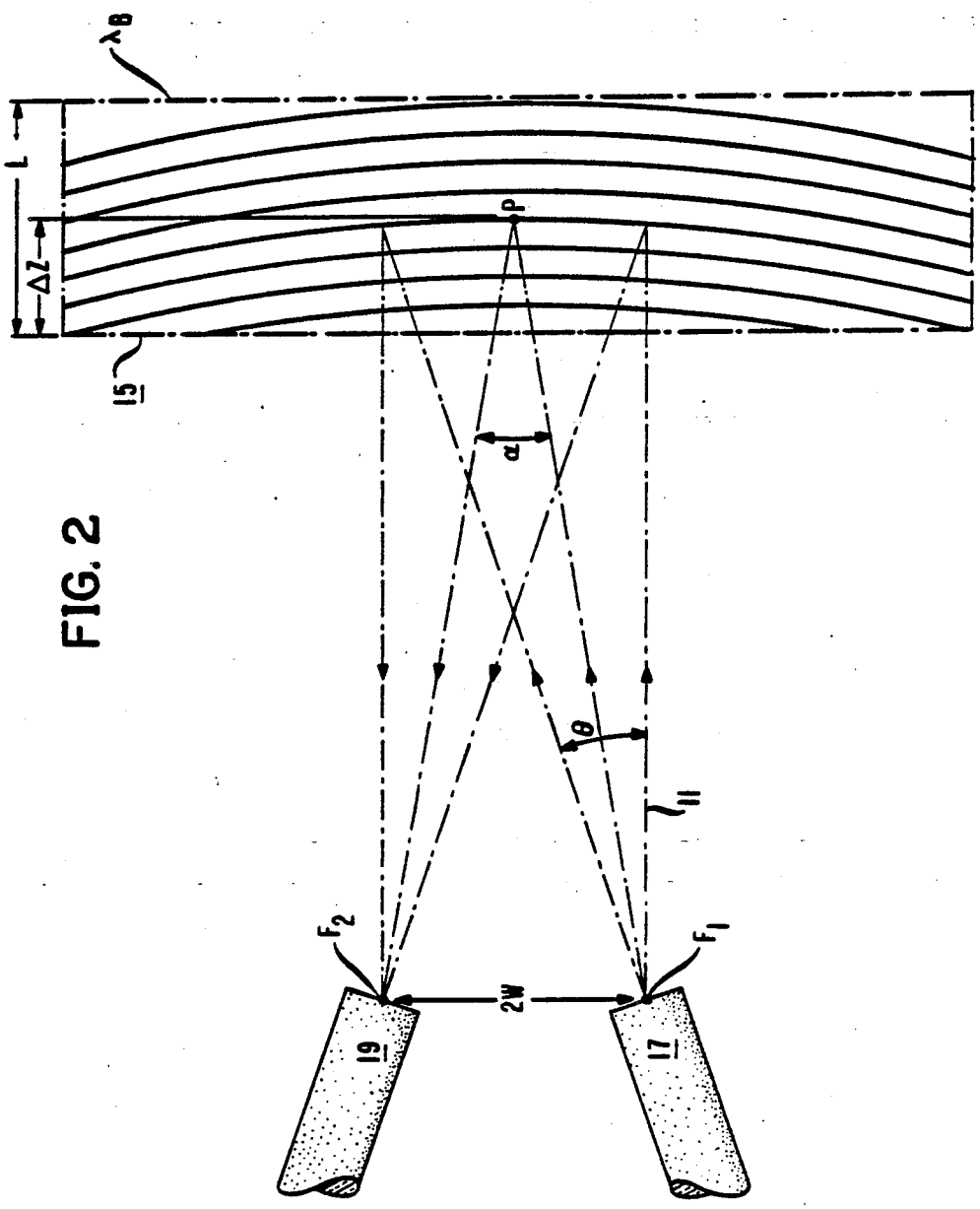
FIG. 2 contains a detailed illustration of an exemplary elliptical Bragg reflector of the present invention.

These and other various parameters are illustrated in the diagram of FIG. 2 which contains an exemplary Bragg reflector 15, showing a number of the individual grating lines comprising reflector 15. In accordance with the present invention, each Bragg reflector comprises a plurality of confocal essentially elliptical grating lines, that is, each grating line will be associated with the same pair of foci, denoted $F_1$ and $F_2$ in FIG. 2. Therefore, light emanating from focal point $F_1$ which is reflected by Bragg reflector 15 will be focused into focal point $F_2$. Accordingly, the exit/entrance ports of pair of input/output waveguides 17 and 19, respectively, are situated at these foci so as to provide maximum coupling of the signal between waveguides. The intersection point P of the axes of input and output waveguides 17 and 19 is shown as being a distance $\Delta z$ from the edge of reflector 15. In accordance with the principles of Bragg reflection, with $\Delta z = L_B/2$, Bragg reflector 15 will exhibit maximum reflectivity at the center wavelength $\lambda_o$ of the band desired to be reflected. Using definitions from filtering arrangements, the wavelengths reflected by Bragg reflector 15 (i.e., within $\lambda_o \pm \Delta\lambda/2$) is referred to as the "stopband", the remaining wavelengths being referred to as the "passband". Thus, with $\Delta z = L_B/2$, reflector 15 will exhibit maximum reflectivity at the center of its stopband.

FIG. 2 also illustrates the angular separation $\alpha$ between input waveguide 17 and output waveguide 19, where this angular separation is a function of the ellipticity of Bragg reflector 15. The beam width $\theta$ (i.e., the angular width of the far-field distribution at half-maximum) of lightwave 11 departing from waveguide 17 is also illustrated. In order for elliptical Bragg reflector 15 to have high reflectivity at the Bragg wavelength $\lambda_B$, it is required that $\alpha^2/\theta$ be less than the quantity $w/L_B$, where $2w$ is the distance between focal points $F_1$ and $F_2$.

For the sake of simplicity, the remaining figures illustrate each of the elliptical Bragg reflectors as a separate rectangular box. It is to be understood that each such Bragg reflector comprises the form of elliptical Bragg reflector 15 of FIG. 2.

Referring back to FIG. 1, first Bragg reflector 14 functions to reflect the portion of incident lightwave 11 with wavelength $\lambda_1$ near the Bragg wavelength $\lambda_{B1}$, allowing the remaining portion of lightwave 11 to propagate therethrough. The reflected signal from reflector 14 then travels back through optical guiding layer 13 and is focused into the entrance port $O_1$ of a first output waveguide 16. As discussed above, waveguide 16 is formed such that its entrance port $O_1$ is located at one of the focal points of first elliptical Bragg reflector 14 (the exit port I of input waveguide 12 being located at the other focal point). As shown in FIGS. 1 and 2, the output waveguides should be slightly tilted with respect to the z axis so as to align with the direction of propagation of the reflected signal.

The remaining portion of lightwave 11 next encounters a second elliptical Bragg reflector 18, where second elliptical reflector 18 is designed in accordance with the above relations so as to reflect the portion of the signal with wavelength $\lambda_2$ near Bragg wavelength $\lambda_{B2}$. As illustrated in FIG. 1, the signal at $\lambda_2$ is focused into the entrance port $O_2$ of a second output waveguide 20, where entrance port $O_2$ is positioned at one of the foci of second elliptical reflector 18 (as above, exit port I of waveguide 12 is located at the other focal point of second elliptical reflector 18). It is to be noted that reflected signal at $O_2$ will be slightly attenuated, since it must travel back through first elliptical reflector 14 before entering second output waveguide 20.

In a similar manner, a third elliptical Bragg reflector 22 is designed to reflect that portion of the signal with wavelength $\lambda_3$ near Bragg wavelength $\lambda_{B3}$ into the entrance port $O_3$ of a third output waveguide 24, and a fourth elliptical Bragg reflector 26 is designed to reflect the remaining signal with wavelength $\lambda_4$ near $\lambda_{B4}$ into the entrance port $O_4$ of a fourth output waveguide 28. As discussed above, entrance ports $O_3$ and $O_4$ associated with waveguides 24 and 28, respectively, are located at one of the focal points of elliptical reflectors 22 and 26, respectively. It is to be noted that each of these signals will experience a degree of attenuation, as it passes through the shorter wavelength elliptical Bragg reflectors twice before entering their respective output waveguides. as a practical matter, this attenuation limits the number of channels that can be multiplexed and demultiplexed with a single arrangement.

As mentioned above, the ordering of the Bragg reflectors within an arrangement such as FIG. 1 may be important. This is due to the fact that Bragg contradirectional coupling (i.e., coupling to radiation or cladding modes) out of the optical guiding layer will occur at wavelengths slightly shorter than the Bragg wavelength of a given reflector. Bragg scattering causes loss for light of these shorter wavelengths as they propagate through the grating. Bragg scattering can be avoided by ordering the reflectors in FIG. 1 so that $\lambda_{B1}<\lambda_{B2}<\lambda_{B3}<\lambda_{B4}$. For example, $\lambda_4$ passes through the first three reflectors in demultiplexer 10 before it is Bragg reflected. Since this signal is at a longer wavelength than the Bragg wavelength of the first three reflectors, it will not be converted into radiation or cladding modes by these reflectors.

FIG. 3 illustrates a cut-away view in perspective of demultiplexer 10 taken along line 3—3 of FIG. 1. In this particular embodiment, input waveguide 12 is illustrated as comprising a core region 32 of a waveguide 30, with a cladding (or base) region 34. As shown, the endface 36 of waveguide 30 is butted against endface 38 of a monolithic reflector unit 39, unit 39 containing optical guiding layer 13. Thus, exit port I of waveguide 12 is defined by endface 36 and the correct placement of core region 32 with respect to guiding layer 13 is necessary to provide focused reflection. As shown in FIG. 3, monolithic reflector unit 39 is formed to comprise as a base layer a silicon substrate 40. Other suitable materials, for example, InP, may also be used as a base for this arrangement. A cladding layer 42 of a suitable material, for example silicon dioxide or InP, is formed to cover substrate 40. When silicon dioxide is utilized, cladding layer 42 may be formed by thermal oxidation of a silicon base layer 40. Alternatively, cladding layer 42 may be deposited. Guiding layer 13 is next formed, where guiding layer 13 is chosen to exhibit a higher index of refraction than cladding layer 42. In particular, guiding layer 13 may comprise $SiO_2$ which is doped with a material to increase its index of refraction. Phosphorus, titanium and germanium are materials often used for this purpose. The amount of doping will influence the index difference between cladding layer 42 and guiding layer 13. Alternatively, when cladding layer comprises InP, guiding layer 13 may comprise the quaternary compound InGaAsP. The structure is completed by a top cladding layer 46 which is similar in composition to cladding layer 42. Therefore, a lightwave signal injected into guiding layer 13 will be confined to this higher index of refraction layer and the combination of these layers will function in a manner similar to a conventional optical fiber.

Subsequent to the formation of guiding layer 13, the gratings used to form Bragg reflectors 14, 18, 22 and 26 may be formed. These gratings may be directly formed by etching away selected portions of guiding layer 13. Alternatively, the gratings may comprise a separately formed grating structure 44, comprising a material such as titanium. In this arrangement, a single layer 43 of a suitable material (e.g., titanium) is deposited to cover over cladding layer 42 and then etched to provide the desired confocal elliptical grating structure 44, as shown in FIG. 3. Since these gratings must be formed as individually designed elliptical sections, special care must be taken in their fabrication. Ordinary reactive ion etching or conventional photolithographic techniques are not capable of providing the resolution needed for making the small period (i.e., submicron) grating lines. One particular resolution-doubling photolithographic technique which allows for the etching of any desired grating line shape (elliptical, circular, etc.) to within the required submicron resolution may be utilized to form the elliptical structures illustrated above. This technique is disclosed in copending application Ser. No. 224,522, (T. E. Jewell), filed July 26, 1988, which is assigned to the present assignee and incorporated herein by reference. In general, the disclosed technique provides twice the resolution of conventional photolithographic systems by performing high pass spatial filtering of the mask image.

Although each elliptical Bragg reflector illustrated in FIG. 3 is shown as containing only a few individual grating lines, it is to be understood that in actual practice, each reflector includes many hundreds of such grating lines, where as mentioned above a large number of lines is required to provide the relatively narrow bandwidth of each reflector's stopband. As illustrated in FIG. 3, the period of each elliptical Bragg reflector is different so that each reflector will reflect the appropriate wavelength. Subsequent to the formation of the gratings, cladding layer 46 is deposited using techniques which will not destroy the structure formed in grating layer 44. In an alternative embodiment (not shown), the Bragg reflectors may be formed by etching through both a top cladding layer 46 and guiding layer 13.

In some applications, it may be necessary to provide low cross-talk (on the order of $-20$ to $-30$ dB) between channels with adjacent wavelengths. In optical receivers, for example, low cross-talk (i.e., inter-signal isolation) is often necessary when the adjacent signals are closely spaced (i.e., separations on the order of 50Å). For demultiplexer 10 of FIG. 1, the reflected power in the passband relative to the peak reflected power falls off linearly with wavelength $(\lambda - \lambda_B)$, as illustrated in FIG. 5. As shown, this provides an isolation of approximately 16 dB at a separation of 50Å between adjacent channels. An isolation of at least 30 dB is considered necessary for most optical receiver purposes. One method of achieving the required amount of isolation is to utilize additional Bragg reflector filters to improve this isolation.

One such exemplary demultiplexing arrangement 50 with one additional filter stage is illustrated in FIG. 4. The portion of arrangement 50 corresponding to arrangement 10 of FIG. 1 maintains the same numeric designations. As shown in FIG. 4, output waveguides 16, 20, 24, and 28 are utilized as inputs to the filter stage of demultiplexer 50, where waveguide 16 is coupled by an elliptical Bragg reflector filter 52 to an output waveguide 56. Elliptical Bragg reflector 52 is configured to comprise a Bragg wavelength of $\lambda_{B1}$ so as to reflect the portion of the signal propagating at wavelength $\lambda_1$ and focus this signal into an output waveguide 56. As before, the exit and entrance ports of waveguides 16 and 56, respectively, are located at the foci of Bragg reflector 52. Similarly, Bragg reflector filter 54 is configured to comprise a Bragg wavelength of $\lambda_{B3}$ and is properly positioned so as to reflect the signal at wavelength $\lambda_3$ into an output waveguide 58. Filters 60 and 62 function in like fashion in association with the signals at wavelengths $\lambda_2$ and $\lambda_4$, respectively. In accordance with the teachings of the present invention, elliptical Bragg reflector filters 52, 54, 60 and 62 may be formed in a similar manner as the Bragg reflectors described above.

The improvement in terms of isolation which may be achieved with this arrangement is evident from the graph of FIG. 5. The left-hand portion of FIG. 5 has been described above. The right-hand side of FIG. 5 illustrates the fall-off, in terms of dB, associated with the double filtering technique described above. Note that the dB scale is double on the right-hand side of the figure. In this configuration, the reflected passband signal power is proportional to $(\lambda - \lambda_B)^2$. Therefore, for a channel separation of approximately 50Å and a channel width of approximately 20Å, a signal isolation of approximately 32 dB may be expected.

In an alternative embodiment, the elliptical Bragg reflector structure of the present invention may be used as an in-line optical filter between stages of an optical amplifier, as illustrated in FIG. 6. An exemplary optical amplifier is disclosed in Ser. No. 225,700 (N. A. Olsson) entitled "Polarization Independent Optical Amplifier Apparatus" filed July 29, 1988, assigned to the present assignee and herein incorporated by reference. This type of optical amplifier may be used as part of an optical receiver or regenerator, eliminating electrical amplifiers and the need to perform optical/electrical and electrical/optical conversions. To utilize such an in-line filter with a two-stage optical amplifier design there are two basic requirements: (1) minimal feedback to the input channels; and (2) narrowband filtering capabilities. Both of these objectives are met with the arrangement as illustrated in FIG. 6. The utilization of elliptical Bragg reflectors minimizes feedback since the reflected signal will be focussed at a point removed from the input signal source. With respect to the narrowband requirement, the second, output stage of such an arrangement is usually a high-gain amplifier and may easily become non-linear in the presence of spontaneous emission. The purpose of the narrowband filter is to maximize the suppression of spontaneous emission which is transmitted from the first (input) to the second (output) amplifier. Since each Bragg reflector filter reflects only those signals within a predetermined narrow band ($\Delta\lambda$), the second stage of the amplifier receives a reduced level of spontaneous emission from the first stage.

Referring to FIG. 6, an optical regenerator 70 is illustrated which includes a first optical amplifier 72 and a second optical amplifier 74, with an optical filter 76 and optical isolator 77 formed therebetween. Isolator 77 is required to prevent feedback from second amplifier 74 to first amplifier 72. Optical filter 76 comprises a plurality of elliptical Bragg reflectors which function in the manner described above. In operation, the output from first optical amplifier 72 comprises a plurality of separately amplified signals centered at wavelengths $\lambda_a$, $\lambda_b$, and $\lambda_c$. Filter 76 includes a first elliptical Bragg reflector 78 with Bragg wavelength $\lambda_{Ba}$ near $\lambda_a$, a second elliptical Bragg reflector 80 with Bragg wavelength $\lambda_{Bb}$ near $\lambda_b$, and a third elliptical Bragg reflector 82 with Bragg wavelength $\lambda_{Bc}$ near $\lambda_c$. In accordance with this embodiment of the present invention, Bragg reflectors 78, 80 and 82 are formed to exhibit the same ellipticity, in contrast to the arrangements described above where each Bragg reflector had a different set of foci, since it is desirable to focus all of the reflected signals along the same path into second optical amplifier 74. Therefore, the amplified output signals from first amplifier 72 propagate along an input waveguide 84 and through an isolator 77, where the exit port $E_x$ of waveguide 84 is located at one of the common focal points of Bragg reflectors 78, 80, 82.

In operation, a first reflected signal with wavelength $\lambda_a$ is redirected by Bragg reflector 78 and the focused into the other remaining focal point of reflector 78, where the entrance port $E_N$ of an output waveguide 86 is located at this focal point. Similarly, signals with wavelength $\lambda_b$ are reflected by Bragg reflector 80 and focused into port $E_N$ of waveguide 86. Reflected signal $\lambda_c$ is likewise focused. As shown in FIG. 6, output waveguide 86 is then coupled to the input of second amplifier 74. As an alternative to the three separate Bragg reflectors described above with Bragg wavelengths $\lambda_{Ba}$, $\lambda_{Bb}$, and $\lambda_{Bc}$, a single chirped Bragg reflector grating formed so that $\lambda_a$, $\lambda_b$, and $\lambda_c$ all lie within the stopband of the reflector may be utilized.

FIG. 7 illustrates yet another arrangement which may utilize the focusing elliptical Bragg reflectors of the present invention. In this example, an optical multiplexer 90 is shown which not only multiplies a plurality of input signals onto one output signal path, but also provides feedback to each of the input signal laser sources. Feedback is important in optical transmission since in the absence of feedback the center wavelength $\lambda_o$ of the optical source may drift with, for example, operating temperature or age of the source. In accordance with the present invention, feedback is achieved by inserting short ($L=X\ L_B$, where $X \leq 1$) circular Bragg reflectors in front of each elliptical Bragg reflector such that a fraction of each signal is directed back towards its source, instead of into the output signal path. Referring to FIG. 7, multiplexer 90 utilizes a set of four input devices (e.g., lasers) operating at wavelengths $\lambda_1$, $\lambda_2$, $\lambda_3$, and $\lambda_4$. Similar to the arrangements discussed above, the signal at wavelength $\lambda_1$ propagates along waveguide 92 and is coupled into an optical guiding layer 93 at the exit port $E_{x1}$ of waveguide 92. Signals with wavelengths $\lambda_1$ near the Bragg wavelength $\lambda_{B1}$ of a first focusing Bragg reflector 94 are reflected and focused into the entrance port $E_N$ of output waveguide 96. The exit and entrance ports of waveguides 92 and 96, respectively, being located at the foci of Bragg reflector 94. A feedback Bragg reflector 98 is formed in front of reflector 94, with concentric circular grating lines centered at the port $E_{x1}$ of waveguide 92, such that a fraction of the signal at $\lambda_1$ will be reflected and focused back into port $E_{x1}$ so as to be returned to the signal source. It is to be understood that the fraction of signal reflected to the source is a function of the length of circular reflector 98.

In a similar manner, the signal at $\lambda_2$ propagates along input waveguide 100 and is coupled into optical guiding layer 93 at the exit port $E_{x2}$ of waveguide 100. Since $\lambda_2$ is near the Bragg wavelength $\lambda_{B2}$ of a second focusing Bragg reflector 102, the signal at this wavelength is focused into entrance port $E_N$ of waveguide 96, where port $E_N$ and $E_{x2}$ are located at the foci of second Bragg reflector 102. A circular feedback Bragg reflector 104 is disposed in front of elliptical Bragg reflector 102 and reflects a portion of the signal at $\lambda_2$ back to exit port $E_{x2}$, so that it returns along waveguide 100 to its source. The signal at $\lambda_3$ operates similarly with input waveguide 106 and a circular feedback Bragg reflector 110 positioned in front of a third elliptical Bragg reflector 108. Similarly, the signal at $\lambda_4$ functions with input waveguide 112, feedback Bragg reflector 116, and elliptical Bragg reflector 114.

The portion of each signal which is transmitted back to its source may represent a small fraction (e.g., less than 10%) of the total signal power. This small signal, however, is sufficient to stabilize the wavelength of each laser source close to the Bragg wavelength of the respective feedback reflector. A monolithic embodiment of this device where the lasers and Bragg reflectors are active and passive ports of the same semiconductor chip may prove highly desirable.

We claim:

1. An optical device comprising
   a first optical waveguide, including entrance and exit ports, capable of supporting a signal at a first optical wavelength $\lambda_O$;
   at least one focusing Bragg reflector comprising a plurality of confocal essentially elliptical grating lines for reflecting optical signals within a bandwidth $\Delta\lambda$ around a first Bragg wavelength $\lambda_{BO}$, $\lambda_O$ being within the bandwidth $\Delta\lambda$ around $\lambda_{BO}$, and transmitting all other optical signals therethrough, said focusing Bragg reflector being disposed in relation to said first optical waveguide such that a port of said first waveguide is located at a first focal point of said plurality of confocal essentially elliptical grating lines; and
   a second optical waveguide, including entrance and exit ports, capable of supporting an optical signal at said first wavelength $\lambda_O$, one port of said second optical waveguide being located at a second, remaining focal point of said plurality of confocal essentially elliptical grating lines forming said focusing Bragg reflector.

2. An optical device as defined in claim 1 further comprising
   an optical guiding medium disposed between the at least one focusing Bragg reflector and said first and second optical waveguides so as to provide transmission of optical signals therebetween.

3. An optical device as defined in claims 1 or 2 wherein the first optical waveguide is further capable of supporting a plurality of N signals at different wavelengths ($\lambda_1, \lambda_2, \ldots, \lambda_N$), said optical device further comprising
   a plurality of N optical waveguides, each including entrance and exit ports and capable of supporting a separate one of said plurality of N optical signals; the at least one focusing Bragg reflector comprising
   a plurality of N focusing Bragg reflectors, each including a plurality of confocal essentially elliptical grating lines, each reflector having a different Bragg wavelength for reflecting a separate one of said plurality of N optical signals into an associated optical waveguide, said plurality of N focusing Bragg reflectors disposed in a serial arrangement such that each share one common focal point, the port of said first optical waveguide being located at said common focal point, and a port of each optical waveguide of said plurality of N optical waveguides being located at a second, remaining focal point of an associated focusing Bragg reflector of said plurality of N focusing Bragg reflectors.

4. An optical device as defined in claim 3 wherein the plurality of N focusing Bragg reflectors are arranged in sequence from the shortest Bragg wavelength to the longest Bragg wavelength, with the shortest wavelength Bragg reflector being positioned nearest the optical waveguides.

5. An optical device as defined in claim 3 wherein $1 \leq N \leq 4$.

6. An optical demultiplexer including
   an input optical waveguide, including entrance and exit ports, capable of supporting a plurality of N optical input signals, each signal associated with a different wavelength ($\lambda_1, \lambda_2, \ldots \lambda_N$);
   a first plurality of N focusing Bragg reflectors disposed in a serial arrangement, each associated with a different one of said plurality of N input signals, wherein each focusing Bragg reflector comprises a plurality of confocal essentially elliptical grating lines and exhibits a different Bragg wavelength for reflecting its associated optical input signal, and each focusing Bragg reflector exhibits a different ellipticity and includes a different pair of foci, said plurality of N focusing Bragg reflectors being disposed in relation to said input optical waveguide such that the exit port of said input optical waveguide is located at one focal point common to each Bragg reflector of said plurality of N focusing Bragg reflectors; and
   a first plurality of N output optical waveguides, including entrance and exit ports, associated in a one-to-one relationship with said plurality of N focusing Bragg reflectors for receiving a separate one of the N reflected signals, the entrance port of each output optical waveguide being located at the second, remaining focal point of its associated focusing Bragg reflector.

7. An optical demultiplexer as defined in claim 6 wherein the demultiplexer further comprises
   an optical guiding medium disposed between the exit port of the input optical waveguide, the plurality of N entrance ports of the output optical waveguides, and the plurality of N focusing Bragg reflectors to provide transmission of optical signals therebetween.

8. An optical demultiplexer as defined in claims 6 or 7 wherein the plurality of N focusing Bragg reflectors are arranged in sequence from shortest Bragg wavelength to longest Bragg wavelength, the reflector with the shortest Bragg wavelength being positioned closest to the optical waveguides.

9. An optical demultiplexer as defined in claim 6 or 7 wherein $1 \leq N \leq 4$.

10. An optical demultiplexer as defined in claim 6 for providing improved isolation between adjacent optical signals of the plurality of N optical input signals, said demultiplexer further comprising a second plurality of N focusing Bragg reflectors, each comprising a plurality of confocal essentially elliptical grating lines, for reflecting a separate one of the plurality of N optical signals reflected from the first plurality of N focusing Bragg reflectors, wherein each focusing Bragg reflector of said second plurality of N focusing Bragg reflectors exhibits a different ellipticity and includes a different pair of foci, one focal point of each focusing Bragg reflector of said second plurality being located at the exit port of its associated output optical waveguide from the first plurality of N output optical waveguides; and a second plurality of N output optical waveguides, including entrance and exit ports, associated in a one-to-one relationship with said second plurality of N focusing Bragg reflectors for receiving a separate one of the twice-reflected N optical signals, the entrance port of each output optical waveguide being located at the second, remaining focal point of its associated focusing Bragg reflector of said second plurality of N focusing Bragg reflectors.

11. An optical demultiplexer as defined in claim 10 wherein $1 \leq N \leq 4$.

12. An optical demultiplexer as defined in claim 10 wherein the arrangement further comprises M pluralities of focusing Bragg reflectors comprising confocal essentially elliptical gratings and M pluralities of output optical waveguides, each plurality of focusing Bragg reflectors disposed to include as foci the associated ports from the previous and subsequent plurality of optical output waveguides, said demultiplexer capable of providing M reflections of said plurality of N optical signals before focusing into said plurality of N output optical waveguides.

13. An optical multiplexer including a plurality of N input optical waveguides, each including separate entrance and exit ports and capable of supporting a separate one of a plurality of N input optical signals $(\lambda_1, \lambda_2, \ldots, \lambda_N)$;

a plurality of N focusing Bragg reflectors disposed in a serial arrangement, each including a plurality of confocal essentially elliptical grating lines and exhibiting a different Bragg wavelength, for reflecting a separate one of said plurality of N input optical signals, each focusing Bragg reflector exhibiting a different ellipticity and disposed to share a first common focal point, the exit port of each input optical waveguide being located at the second, remaining focal point of its associated focusing Bragg reflector; and an output optical waveguide, including separate entrance and exit ports, capable of supporting the plurality of N reflected optical signals, the entrance port of said output optical waveguide being located at the first common focal point of said plurality of N focusing Bragg reflectors.

14. An optical multiplexer as defined in claim 13 wherein the multiplexer further comprises an optical guiding medium disposed between the plurality of N input optical waveguides, the output optical waveguide, and the plurality of N focusing Bragg reflectors for providing transmission of optical signals therebetween.

15. An optical multiplexer as defined in claims 13 or 14 wherein the plurality of N focusing Bragg reflectors are arranged in sequence from shortest Bragg wavelength to longest Bragg wavelength, the reflector with the shortest Bragg wavelength being positioned closest to the optical waveguides.

16. An optical multiplexer as defined in claims 13 or 14 wherein $1 \leq N \leq 4$.

17. An optical multiplexer as defined in claims 13 or 14 which is capable of providing optical feedback between at least one Bragg reflector of the plurality of N focusing Bragg reflectors and at least one input waveguide of the plurality of N input optical waveguides, said multiplexer further comprising at least one feedback Bragg reflector associated with a corresponding focusing Bragg reflector and comprising a plurality of grating lines configured so as to redirect the reflected optical signal into the exit port of the associated input optical waveguide.

18. An optical feedback multiplexer as defined in claim 17 wherein the at least one feedback Bragg reflector comprises a plurality of N feedback Bragg reflectors, associated in a one-to-one relationship with the plurality of N focusing Bragg reflectors.

19. An optical feedback multiplexer as defined in claim 17 wherein each feedback Bragg reflector comprises a relatively few grating lines in relation to its associated focusing Bragg reflector so that only a fraction of the associated input optical signal is redirected into the exit port of the associated input optical waveguide.

20. An optical feedback multiplexer as defined in claim 17 wherein each feedback Bragg reflector comprises a plurality of confocal circular grating lines and is disposed such that its associated exit port is located at the focus of said plurality of confocal circular grating lines.

21. An optical feedback multiplexer as defined in claim 17 wherein the feedback multiplexer further comprises a plurality of N laser-based signal sources, each source associated in a one-to-one relationship with the plurality of N input optical waveguides.

22. An optical feedback multiplexer as defined in claim 21 wherein all components are formed on a single substrate.

23. An optical filter comprising an input optical waveguide, including separate entrance and exit ports, capable of supporting a plurality of N optical input signals $(\lambda_1, \lambda_2, \ldots \lambda_N)$;

a plurality of N focusing Bragg reflectors disposed in a serial arrangement, each including a plurality of confocal essentially elliptical grating lines and exhibiting a different Bragg wavelength, for reflecting a separate one of said plurality of N optical input signals, the plurality of N focusing Bragg reflectors exhibiting a substantially identical ellipticity and sharing a pair of common focal points, the exit port of said input optical waveguide being located at a first focal point of said pair of common focal points; and an output optical waveguide, including separate entrance and exit ports, capable of supporting the plurality of N reflected optical signals, the entrance port of said output optical waveguide located at a second, remaining focal point of said pair of common focal points.

24. An optical filter as defined in claim 23 wherein the input optical waveguide is defined as the output of a first optical amplifier, and the output optical waveguide is defined as the input to a second optical amplifier, the plurality of N focusing Bragg reflectors functioning as an in-line optical filter between said first and second optical amplifiers.

25. An optical filter as defined in claim 24 wherein the filter further comprises an optical isolator disposed between the first and second optical amplifiers.

26. An optical filter as defined in claims 24 or 25 wherein all components are formed on a single substrate.

* * * * *